US007529715B2

(12) United States Patent
Rogowicz et al.

(10) Patent No.: US 7,529,715 B2
(45) Date of Patent: May 5, 2009

(54) ESTIMATING VALUE OF A PREVIOUSLY-USED EXHIBIT

(75) Inventors: Raymond C. Rogowicz, 141 Water St., Ovilla, TX (US) 75154; Tina Marie Coles, Richardson, TX (US)

(73) Assignee: Raymond C. Rogowicz, Oville, TX (US)

(*) Notice: Subject to any disclaimer, the term of this patent is extended or adjusted under 35 U.S.C. 154(b) by 630 days.

(21) Appl. No.: 11/078,953

(22) Filed: Mar. 11, 2005

(65) Prior Publication Data

US 2005/0216425 A1 Sep. 29, 2005

Related U.S. Application Data

(60) Provisional application No. 60/552,513, filed on Mar. 12, 2004.

(51) Int. Cl.
*G06F 17/60* (2006.01)

(52) U.S. Cl. .......................................... 705/400; 705/1

(58) Field of Classification Search ................. 705/400, 705/1
See application file for complete search history.

(56) References Cited

U.S. PATENT DOCUMENTS 5,911,131 A * 6/1999 Vig ................................ 705/1
6,202,051 B1 * 3/2001 Woolston ....................... 705/26
2001/0007971 A1 * 7/2001 Okada ......................... 702/187
2003/0200151 A1 * 10/2003 Ellenson et al. ............... 705/26
2004/0093284 A1 * 5/2004 Takaoka et al. ............... 705/27
2004/0117319 A1 * 6/2004 Oshima et al. ................ 705/75

OTHER PUBLICATIONS

WEBI Evaluation Center Exhibit Data Form (accessed Feb. 21, 2003, available at: http://web.archive.org/web/20030221083532/http://www.boothfinder.com/Forms_Confirmations/DataForm.cfm).*

* cited by examiner

*Primary Examiner*—John W Hayes
*Assistant Examiner*—Kevin Flynn
(74) *Attorney, Agent, or Firm*—Robert A. Voight, Jr.; Winstead P.C.

(57) ABSTRACT

A method, computer program product and system for estimating the value of a previously-used exhibit. The value of a previously-used exhibit may be calculated by receiving an original price of the exhibit, the year the exhibit was purchased, the condition of the exhibit and the number of shows the exhibit was displayed. An age percentage factor may be determined based on an age of the exhibit which is determined based on the year the exhibit was purchased. A base price may then be calculated based on the original price and the age percentage factor. A price reduced per showing may be calculated based on the base price and the number of shows the exhibit was displayed. After determining a condition adjustment based on the condition of the exhibit, an estimate of the value of the exhibit may be calculated based on the price reduced per showing and the condition adjustment.

12 Claims, 5 Drawing Sheets

ESTIMATING VALUE OF A PREVIOUSLY-USED EXHIBIT

PRIORITY BENEFIT AND CROSS REFERENCE TO RELATED APPLICATION

This application is related to the following commonly owned copending U.S. Patent Application:

Provisional Application Ser. No. 60/552,513, "Improved Method and System for Estimating Value of Previously Owned Exhibits", filed Mar. 12, 2004, and claims the benefit of its earlier filing date under 35 U.S.C. § 119(e).

TECHNICAL FIELD

The present invention relates to the field of exhibits, and more particularly to estimating the value of a previously-used exhibit.

BACKGROUND INFORMATION

Often at trade shows, conventions or other public or quasi-public events there are booths with exhibits displaying information about a product or service. New exhibits at these trade shows and the like may range in price from $500 to over $5,000,000. Once these exhibits have been used at the trade show or the like, they are typically discarded. They are typically discarded as the owners of these used exhibits have no means of valuing them thereby in essence equating them to have little or no value.

However, previously-used exhibits do have value especially for those who do not have the monies to purchase a new exhibit and would prefer to purchase a previously-used exhibit at a price less than the cost of a new exhibit.

Hence, there is a need for owners of exhibits to be able to determine the value of a used exhibit thereby being able to sell it to those who desire to purchase a used exhibit rather than a new exhibit. However, there is no current means of evaluating a previously-used exhibit.

Therefore, there is a need in the art for accurately evaluating previously-used exhibits.

SUMMARY

The problems outlined above may at least in part be solved in some embodiments by calculating an estimated price of a previously-used exhibit based on the type of the exhibit, the year the exhibit was purchased, the condition of the exhibit, the number of shows the exhibit was displayed and the original purchase price.

In one embodiment of the present invention, a method for estimating the value of a previously-used exhibit may comprise the step of receiving an original price of the previously-used exhibit. The method may further comprise determining an age percentage factor based on an age of the previously-used exhibit. The method may further comprise calculating a base price based on the original price and the age percentage factor. The method may further comprise receiving a number of shows the previously-used exhibit was displayed. The method may further comprise calculating a price reduced per showing based on said base price and said number of shows said previously-used exhibit was displayed. The method may further comprise determining a condition adjustment based on a condition of the previously-used exhibit. The method may further comprise calculating a final estimated price based on the price reduced per showing and the condition adjustment.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for estimating the value of a previously-used exhibit. In one embodiment of the present invention, the value of a previously-used exhibit may be calculated by receiving an original price of the previously-used exhibit, the year the exhibit was purchased, the condition of the previously-used exhibit and the number of shows the previously-used exhibit was displayed. An age percentage factor may be determined based on an age of the previously-used exhibit which is determined based on the year the exhibit was purchased. A base price may then be calculated based on the original price and the age percentage factor. A price reduced per showing may then be calculated based on the base price and the number of shows the previously-used exhibit was displayed. After determining a condition adjustment based on the condition of the previously-used exhibit, a final estimated price (estimate of the value of the previously-used exhibit) may be calculated based on the price reduced per showing and the condition adjustment.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
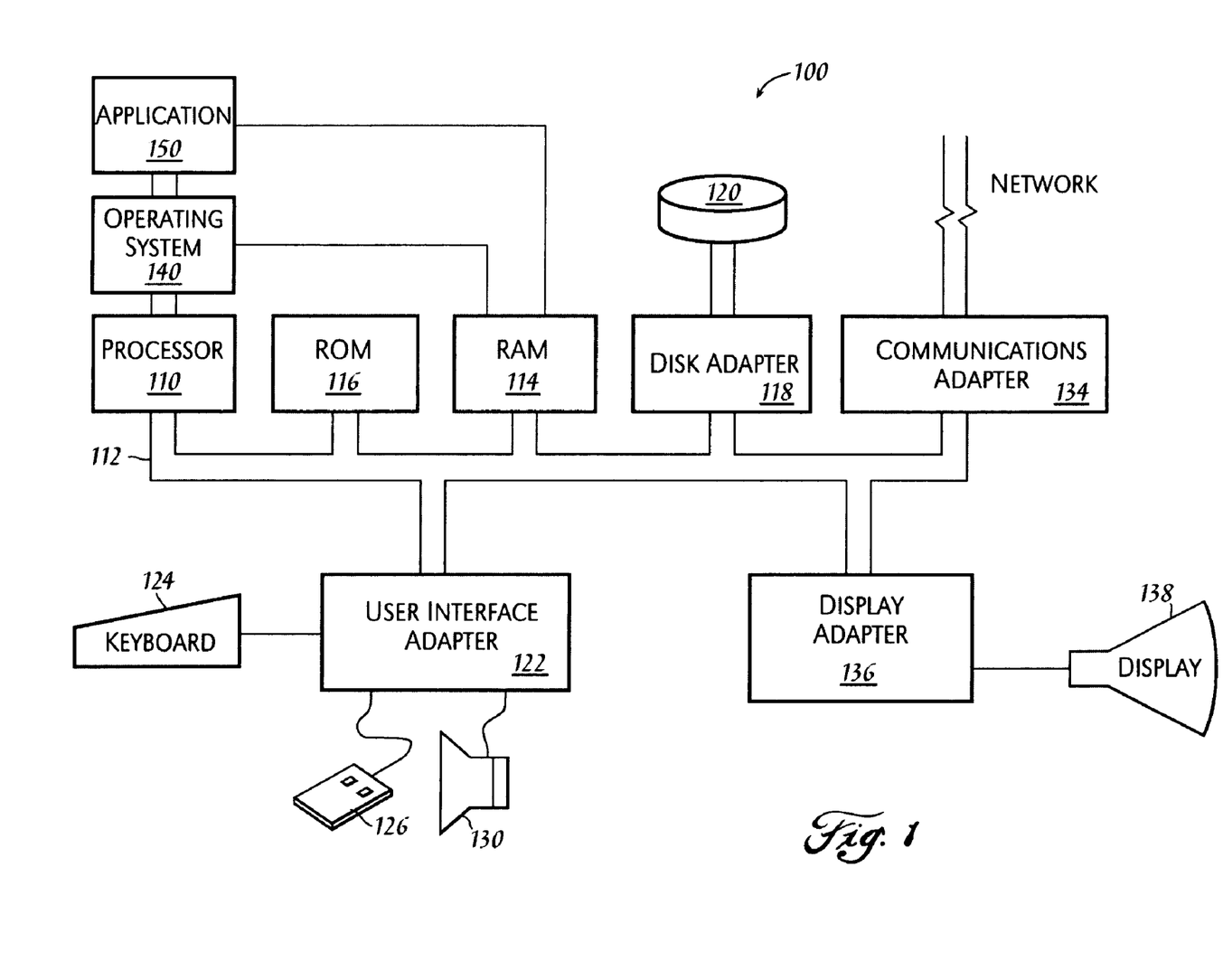
FIG. 1 illustrates an embodiment of the present invention of a computer system.

FIG. 1—Computer System

FIG. 1 illustrates a typical hardware configuration of computer system 100 (FIG. 1) which is representative of a hardware environment for practicing the present invention. Referring to FIG. 1, computer system 100 may have a processor 110 coupled to various other components by system bus 112. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Application 150 may include, for example, an application configured to estimate the value of a previously-used exhibit as discussed further below in association with FIGS. 2A-D.

Read only memory (ROM) 116 may be coupled to system bus 112 and include a basic input/output system ("BIOS") that controls certain basic functions of computer system 100. ROM 116 may be configured to store the percentages and values used in estimating the value of a previously-used exhibit as discussed further below in association with FIGS. 2A-D. Random access memory (RAM) 114 and disk adapter 118 may also be coupled to system bus 112. It should be noted that software components including operating system 140 and application 150 may be loaded into RAM 114 which may be computer system's 100 main memory. Disk adapter 118 may be an integrated drive electronics ("IDE") adapter that communicates with a disk unit 120, e.g., disk drive. It is noted that the application that computes an estimate as to the value of a previously-used exhibit, as discussed further below in association with FIGS. 2A-D, may reside in disk unit 120 or in application 150. It is further noted that the percentages and values used in estimating the value of a previously-used exhibit as discussed further below in association with FIGS. 2A-D may reside in disk unit 120.

Returning to FIG. 1, communications adapter 134 may also be coupled to system bus 112. Communications adapter 134 may interconnect bus 112 with an outside network, e.g., local area network ("LAN"), wide area network ("WAN"), enabling computer system 100 to communicate with other similar devices. Input/Output devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 or speaker 130.

Implementations of the invention include implementations as a computer system programmed to execute the method or methods described herein, and as a computer program product. According to the computer system implementations, sets of instructions for executing the method or methods may be resident in the random access memory 114 of one or more computer systems configured generally as 10 described above. Until required by computer system 100, the set of instructions may be stored as a computer program product in another computer memory, for example, in disk unit 120. Furthermore, the computer program product may also be stored at another computer and transmitted when desired to the user's workstation by a network or by an external network such as the Internet. One skilled in the art would 15 appreciate that the physical storage of the sets of instructions physically changes the medium upon which it is stored so that the medium carries computer readable information. The change may be electrical, magnetic, or chemical.

Figure 2A:
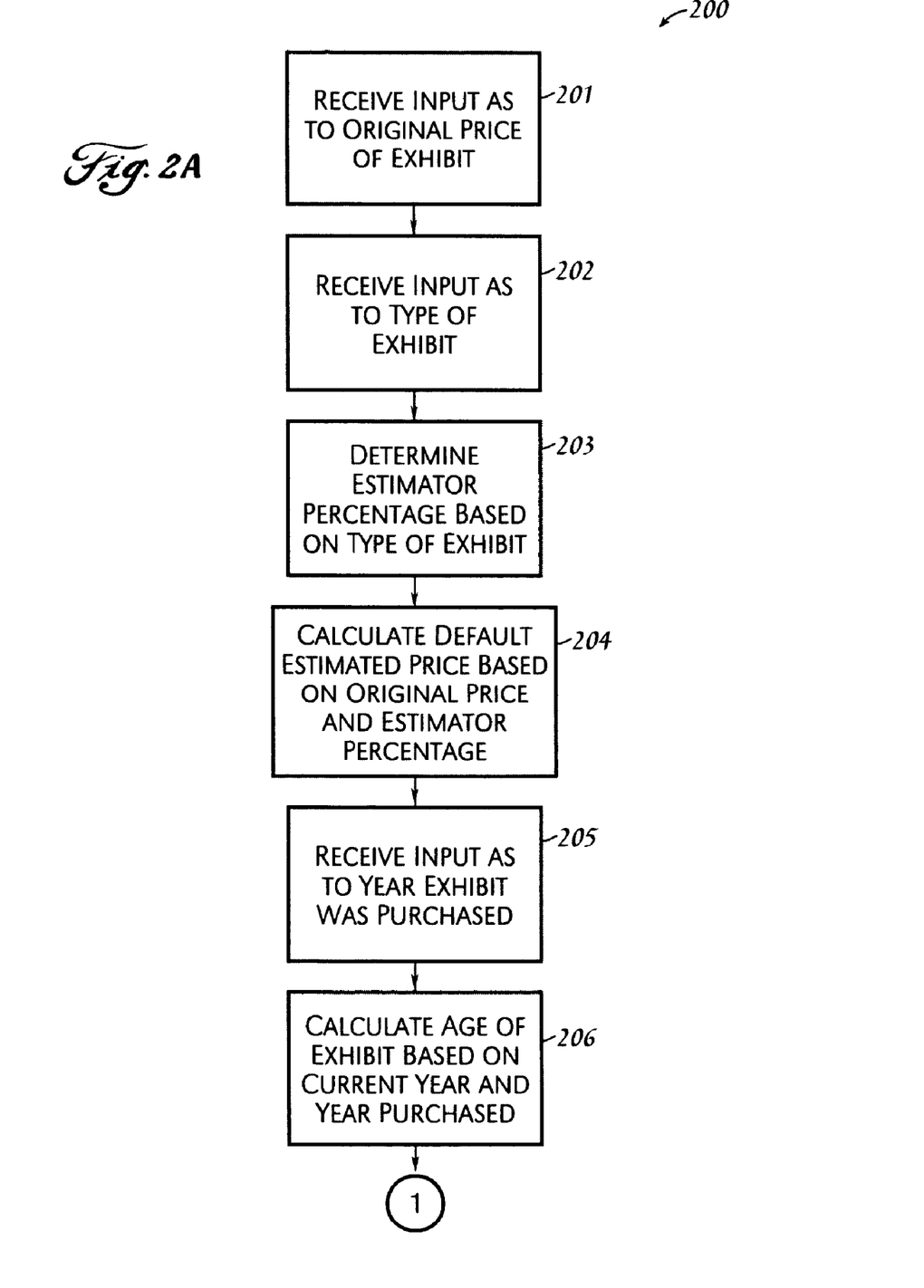
FIGS. 2A-D are flowcharts of a method for estimating the value of a previously-used exhibit in accordance with an embodiment of the present invention.

It is noted that computer system 100 is not limited in scope to any one particular embodiment. It is further noted that computer system 100 may any type of system that includes a processor, a memory and an application as described herein. For example, computer system 100 may be a server hosting a web site where the server operates an application configured to estimate the value of a previously-used exhibit as described herein. Such a computer system 100 may be configured to receive input, as described below in association with FIG. 2, from client computers via a network, e.g., LAN, WAN.

As stated in the Background Information section, previously-used exhibits have value especially for those who do not have the monies to purchase a new exhibit and would prefer to purchase a previously-used exhibit at a price less than the cost of a new exhibit. Hence, there is a need for owners of exhibits to be able to determine the value of a used exhibit thereby being able to sell it to those who desire to purchase a used exhibit rather than a new exhibit. However, there is no current means of evaluating a previously-used exhibit. Therefore, there is a need in the art for accurately evaluating previously-used exhibits. A method for accurately evaluating previously-used exhibits is described below in association with FIGS. 2A-D.

FIGS. 2A-D—Method for Estimating the Value of a Previously-Used Exhibit

FIGS. 2A-D are a flowchart of one embodiment of the present invention of a method 200 for estimating the value of a previously-used exhibit.

Referring to FIG. 2A, in conjunction with FIG. 1, in step 201, computer system 100 receives as input an original price of a previously-used exhibit.

In step 202, computer system 100 receives as input a type of the previously-used exhibit. Examples of a type for an exhibit include indicated whether the exhibit is portable/modular or custom fabricated. In one embodiment, the user may be able to specify the type (sub-type) of portable/modular, e.g., a table top, custom fabricated exhibit. Further, computer system 100 may receive as input the builder of the exhibit.

In step 203, computer system 100 determines what is referred to herein as an "estimator percentage" based on the type of the previously-used exhibit. For example, an estimator percentage may be 18.127% for portable/modular types and 23.775% for custom fabrication types.

In step 204, computer system 100 calculates what is referred to herein as the "default estimated price" based on the original price and the estimator percentage. In one embodiment, the default estimated price is calculated using the following equation:

$$\text{default estimated price} = \text{original price} * \text{estimator percentage} \quad (EQ1)$$

where the original price is received in step 201; and where the estimator percentage is determined in step 203.

In step 205, computer system 100 receives as input the year the previously-used exhibit was purchased. In step 206, computer system 100 calculates the age of the previously-used exhibit based on the current year and the year the exhibit was purchased. In one embodiment, the age of the previously-used exhibit is calculated using the following equation:

$$\text{age of exhibit} = \text{current year} - \text{year purchased} \quad (EQ2)$$

where the year purchased is received in step 205. If the age of the previously-used exhibit is less than one, i.e., the exhibit is purchased in the current year, then the age of the previously-used exhibit may be set to the value of one.

Figure 2B:
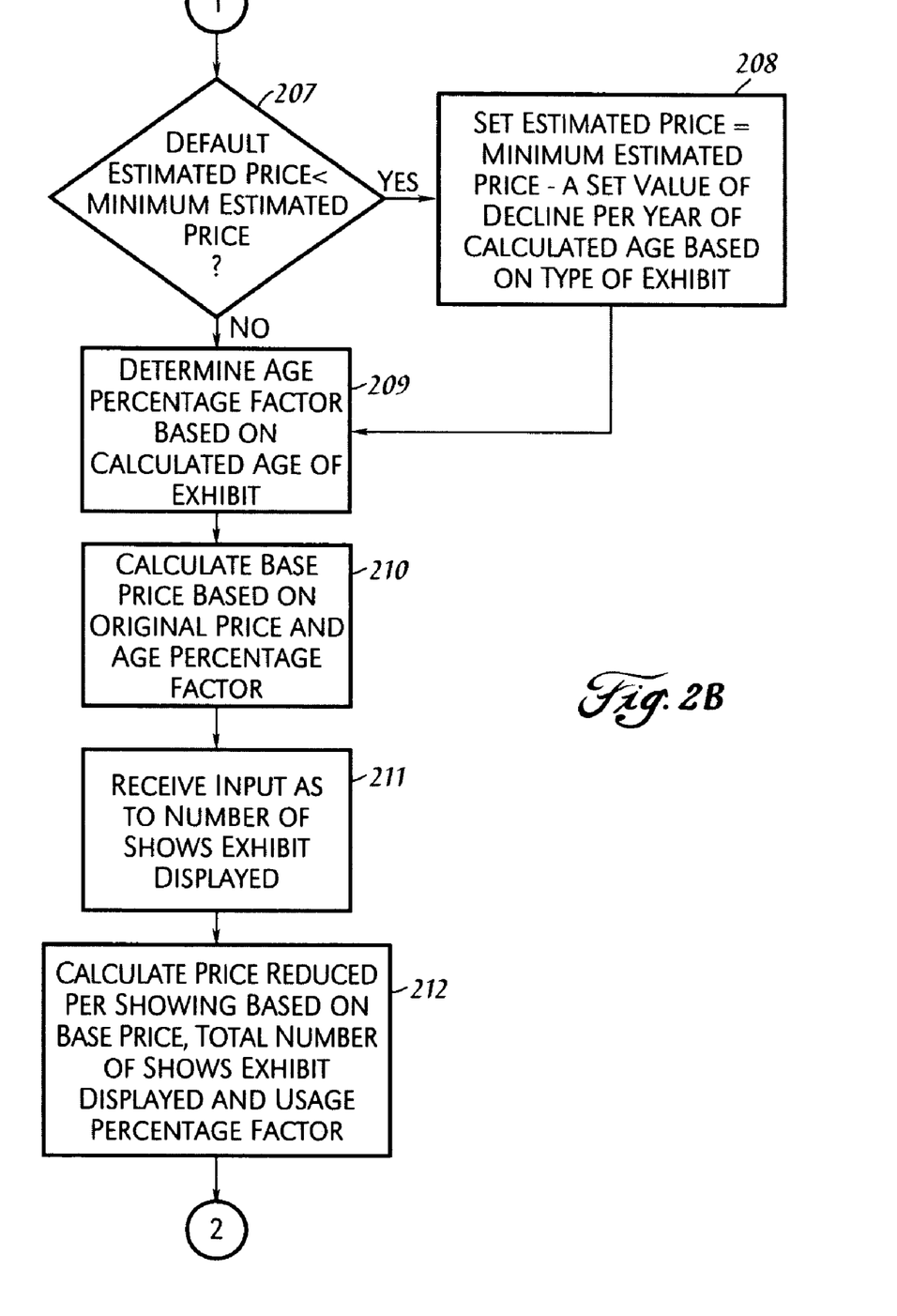

Referring to FIG. 2B, in conjunction with FIG. 1, in step 207, computer system 100 determines whether the default estimated price (calculated in step 204) is less than a minimum estimated price. If so, then computer system 100 sets the default estimated price to a new value using the following equation:

$$\text{default estimated price} = \text{minimum estimated price} - \text{set value of decline per year of calculated age based on the type of the previously-used exhibit} \quad (EQ3)$$

where the calculated age is computed in step 206; and where the set value of decline depends on the type of the exhibit which is received in step 202. For example, if the type of the exhibit is a table top, then the set value of decline may be $10 for each year of the calculated age. If the calculated age of the exhibit is five years, then $50 ($10 decline*5 years) is subtracted from the minimum estimated price. In another example, if the type of the exhibit is a portable popup, then the set value of decline may be $10 for each year of the calculated age. In another example, if the type of the exhibit is a panel display, then the set value of decline may be $15 for each year of the calculated age. In another example, if the type of the exhibit is a custom modular, then the set value of decline may be $25 for each year of the calculated age. In another example, if the type of the exhibit is a truss system, then the set value of decline may be $10 for each year of the calculated age.

If, however, the default estimated price was not less than the minimum estimated price or upon executing step 208, then computer system 100, in step 209, determines what is referred to herein as the "age percentage factor" based on the calculated age of the previously-used exhibit (computed in step 206). For example, if the calculated age is 0 to 1 years, then the age percentage factor may be 60%. If the calculated age is 2 years, then the age percentage factor may be 50%. If the calculated age is 3 years, then the age percentage factor may be 40%. If the calculated age is 4 years, then the age percentage factor may be 30%. If the calculated age is 5 years, then the age percentage factor may be 20%. If the calculated age is 6 years, then the age percentage factor may be 10%. If the calculated age is 7 years or older, then the age percentage factor may be 0%.

In step 210, computer system 100 calculates what is referred to herein as the "base price" based on the original price and the age percentage factor. In one embodiment, the base price is calculated using the following equation:

$$\text{base price} = \text{original price} * \text{age percentage factor} \quad (EQ4)$$

where the original price is received in step 201; and where the age percentage factor is determined in step 209.

In step 211, computer system 100 receives as input the number of shows that the previously-used exhibit was displayed. In step 212, computer system 100 calculates what is referred to herein as the "price reduced per showing" based on the base price, the total number of shows the previously-used exhibit was displayed and a factor referred to herein as the "usage percentage factor". In one embodiment, the price reduced per showing is calculated using the following equation:

$$\text{price reduced per showing} = \text{base price} - (\text{base price} * \text{total number of shows}) * (\text{usage percentage factor}) \quad (EQ5)$$

where the base price is calculated in step 210; where the total number of shows is received in step 211; and where the usage percentage factor is a designated value. For example, in one embodiment, the usage percentage factor is equal to 4%.

Figure 2C:
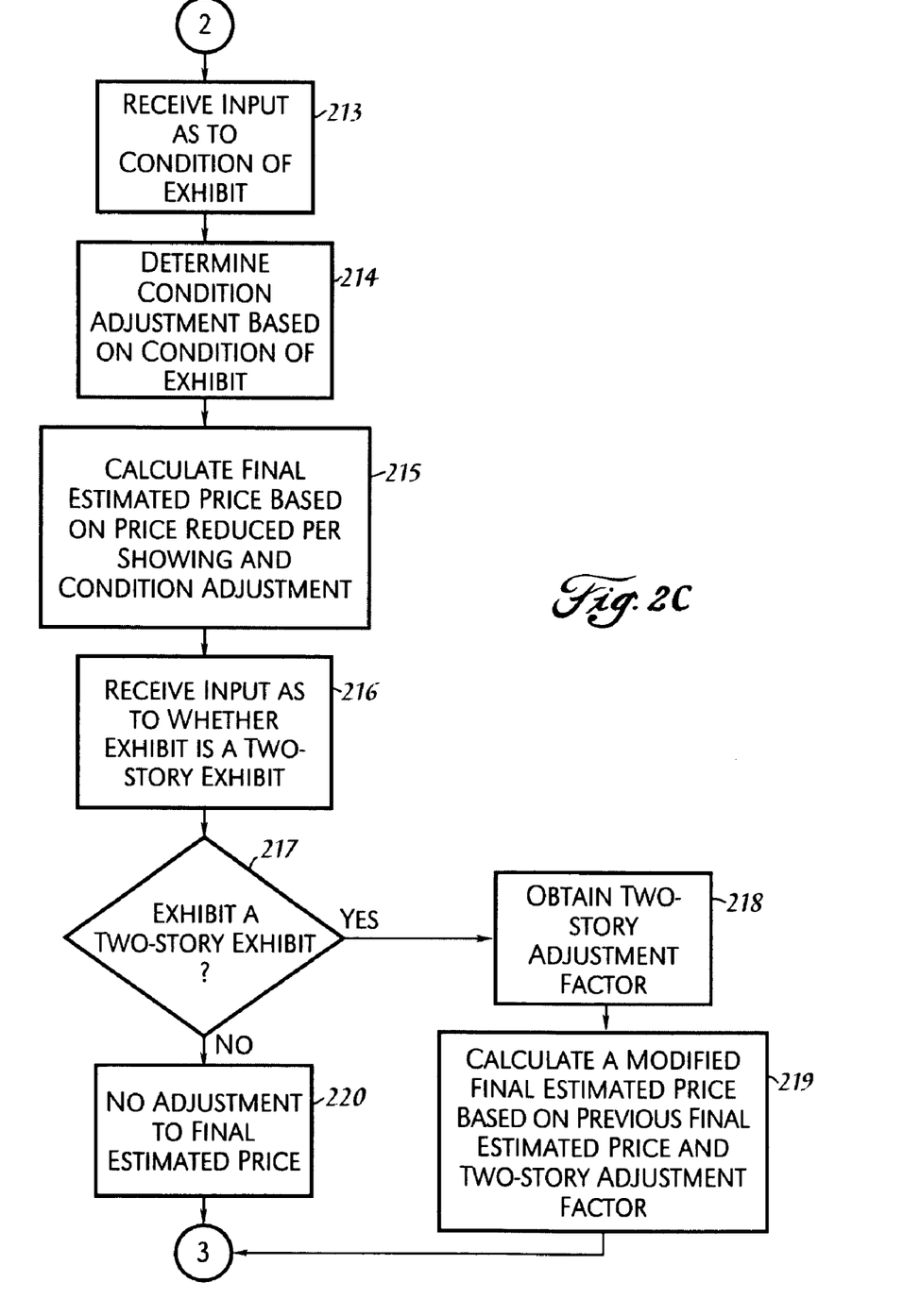

Referring to FIG. 2C, in conjunction with FIG. 1, in step 213, computer system 100 receives as input the condition of the previously-used exhibit. For example, the condition may be rated by the owner of the previously-used exhibit as either excellent, above average, average or poor. In step 214, computer system 100 determines what is referred to herein as the "condition adjustment" based on the condition of the exhibit received in step 213. In one embodiment, if the condition of the exhibit is excellent, then the condition adjustment value is 10%. If the condition of the exhibit is above average, then the condition adjustment value is 5%. If the condition of the exhibit is average, then the condition adjustment value is 0%. If the condition of the exhibit is poor, then the condition adjustment value is -20%.

In step 215, computer system 100 calculates the final estimated price (estimate of the value of the previously-used exhibit) based on the price reduced per showing and the condition adjustment. In one embodiment, the final estimated price is calculated using the following equation:

$$\text{final estimated price} = \text{price reduced per showing} + (\text{price reduced per showing} * \text{condition adjustment}) \quad (EQ6)$$

where the price reduced per showing is calculated in step 212; and where the condition adjustment is determined in step 214.

In step 216, computer system 100 receives as input an indication as to whether the exhibit is a two-story exhibit. In step 217, computer system 100 determines whether the exhibit is a two-story exhibit. If the exhibit is a two-story exhibit, then in step 218, computer system 100 obtains what is referred to herein as the "two-story adjustment factor". In one embodiment, the two-story adjustment factor is 25%. In step 219, computer system 100 calculates a modified final estimated price based on the final estimated price and on the two-story adjustment factor. In one embodiment, the modified final estimated price is calculated using the following equation:

$$\text{modified final estimated price} = \text{final estimated price} + (\text{final estimated price} * \text{two-story adjustment factor}) \quad (EQ7)$$

where the final estimated price is calculated in step 215; where the two-story adjustment factor is obtained in step 218.

If, however, the exhibit is not a two-story exhibit, then, in step 220, no adjustment is made to the final estimated price calculated in step 215.

Figure 2D:
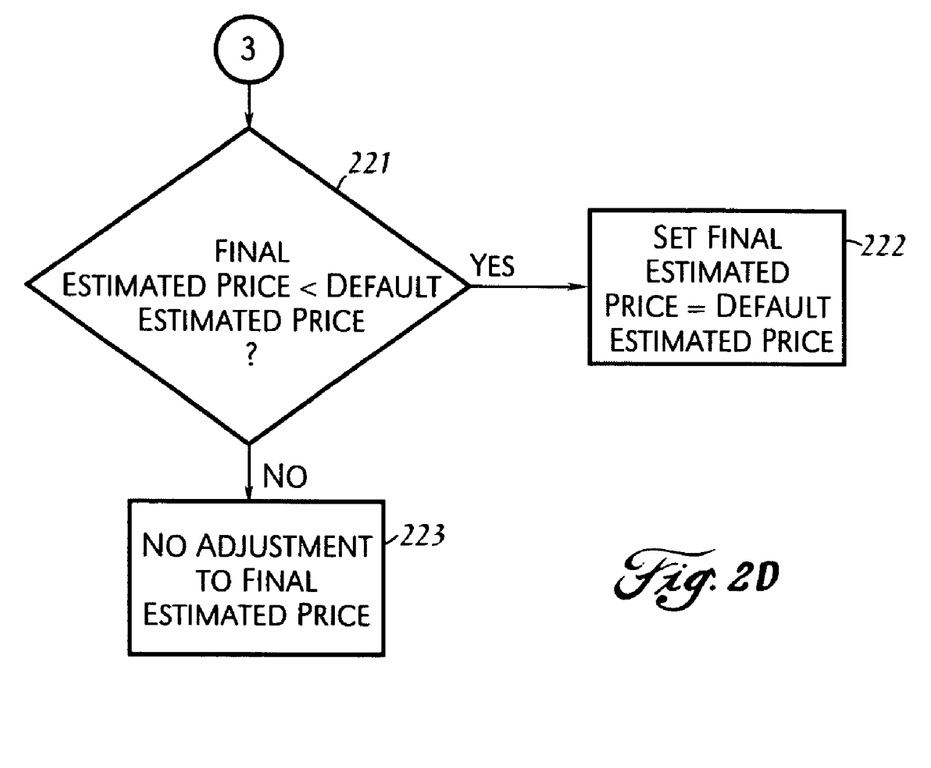

Referring to FIG. 2D, in conjunction with FIG. 1, upon execution of steps 219 or 220, in step 221, computer system 100 determines whether the final estimated price is less than the default estimated price. If the final estimated price is less than the default estimated price, then, in step 222, computer system 100 sets the final estimated price (calculated in either step 215 or step 219) to equal the default estimated price (calculated in step 204). If, however, the final estimated price is not less than the default estimated price, then in step 223, no adjustment is made to the final estimated price calculated in either step 215 or step 219.

It is noted that the percentages and values indicated herein are illustrative and that the present invention is not limited to using such percentages and values. It is further noted that method 200 may include other and/or additional steps that, for clarity, are not depicted. It is further noted that method 200 may be executed in a different order presented and that the order presented in the discussion of FIG. 2 is illustrative. It is further noted that certain steps in method 200 may be executed in a substantially simultaneous manner.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for estimating the value of a previously-used exhibit comprising the steps of:
   receiving by a computer system an original price of said previously-used exhibit;
   receiving by said computer system an age of said previously-used exhibit;
   determining by said computer system an age percentage factor based on said age of said previously-used exhibit;
   calculating by said computer system a base price based on said original price and said age percentage factor;
   receiving by said computer system a number of shows said previously-used exhibit was displayed;
   calculating by said computer system a price reduced per showing based on said base price and said number of shows said previously-used exhibit was displayed;
   receiving by said computer system a condition of said previously-used exhibit;
   determining by said computer system a condition adjustment based on said condition of said previously-used exhibit;
   calculating by said computer system a final estimated price based on said price reduced per showing and said condition adjustment;
   receiving by said computer system a type of said previously-used exhibit;
   determining by said computer system an estimator percentage based on said type of said previously-used exhibit;
   calculating by said computer system a default estimated price based on said original price and said estimator percentage;
   setting by said computer system said default estimated price to equal a minimum estimated price minus a set value of decline per year of age of said previously-used exhibit when said default estimated price is less than said minimum estimated price; and
   setting by said computer system said final estimated price to equal said default estimated price when said final estimated price is less than said default estimated price.

2. The method as recited in claim 1 further comprising the steps of:
   receiving a year said previously-used exhibit was purchased; and
   calculating an age of said previously-used exhibit based on a current year and said year said previously-used exhibit was purchased.

3. The method as recited in claim 2, wherein said age percentage factor is determined based on said calculated age of said previously-used exhibit.

4. The method as recited in claim 1 further comprising the steps of:
   receiving an input that said previously-used exhibit is a two-story exhibit;
   obtaining a two-story adjustment factor when said previously-used exhibit is said two-story exhibit; and
   modifying said final estimated price based on said two-story adjustment factor before the step of setting by said computer system said final estimated price to equal said default estimated price when said final estimated price is less than said default estimated price.

5. A computer program product tangibly embodied in a computer readable storage medium for estimating the value of a previously-used exhibit comprising the programming steps of:
   receiving an original price of said previously-used exhibit;
   receiving an age of said previously-used exhibit;
   determining an age percentage factor based on said age of said previously-used exhibit;
   calculating a base price based on said original price and said age percentage factor;
   receiving a number of shows said previously-used exhibit was displayed;
   calculating a price reduced per showing based on said base price and said number of shows said previously-used exhibit was displayed;
   receiving a condition of said previously-used exhibit;
   determining a condition adjustment based on said condition of said previously-used exhibit;
   calculating a final estimated price based on said price reduced per showing and said condition adjustment;
   receiving a type of said previously-used exhibit;
   determining an estimator percentage based on said type of said previously-used exhibit;
   calculating a default estimated price based on said original price and said estimator percentage;
   setting said default estimated price to equal a minimum estimated price minus a set value of decline per year of age of said previously-used exhibit when said default estimated price is less than said minimum estimated price; and
   setting said final estimated price to equal said default estimated price when said final estimated price is less than said default estimated price.

6. The computer program product as recited in claim 5 further comprising the programming steps of:
   receiving a year said previously-used exhibit was purchased; and
   calculating an age of said previously-used exhibit based on a current year and said year said previously-used exhibit was purchased.

7. The computer program product as recited in claim 6, wherein said age percentage factor is determined based on said calculated age of said previously-used exhibit.

8. The computer program product as recited in claim 5 further comprising the programming steps of:
   receiving an input that said previously-used exhibit is a two-story exhibit;
   obtaining a two-story adjustment factor when said previously-used exhibit is said two-story exhibit; and
   modifying said final estimated price based on said two-story adjustment factor before the step of setting said final estimated price to equal said default estimated price when said final estimated price is less than said default estimated price.

9. A system, comprising:
   a memory unit operable for storing a computer program for estimating the value of a previously-used exhibit; and
   a processor coupled to said memory unit, wherein said processor, responsive to said computer program, comprises:
      circuitry for receiving an original price of said previously-used exhibit;
      circuitry for receiving an age of said previously-used exhibit;
      circuitry for determining an age percentage factor based on said age of said previously-used exhibit;
      circuitry for calculating a base price based on said original price and said age percentage factor;
      circuitry for receiving a number of shows said previously-used exhibit was displayed;
      circuitry for calculating a price reduced per showing based on said base price and said number of shows said previously-used exhibit was displayed;

circuitry for receiving a condition of said previously-used exhibit;

circuitry for determining a condition adjustment based on said condition of said previously-used exhibit;

circuitry for calculating a final estimated price based on said price reduced per showing and said condition adjustment;

circuitry for receiving a type of said previously-used exhibit;

circuitry for determining an estimator percentage based on said type of said previously-used exhibit;

circuitry for calculating a default estimated price based on said original price and said estimator percentage;

circuitry for setting said default estimated price to equal a minimum estimated price minus a set value of decline per year of age of said previously-used exhibit when said default estimated price is less than said minimum estimated price; and circuitry for setting said final estimated price to equal said default estimated price when said final estimated price is less than said default estimated price.

10. The system as recited in claim 9, wherein said processor further comprises:

circuitry for receiving a year said previously-used exhibit was purchased; and circuitry for calculating an age of said previously-used exhibit based on a current year and said year said previously-used exhibit was purchased.

11. The system as recited in claim 10, wherein said age percentage factor is determined based on said calculated age of said previously-used exhibit.

12. The system as recited in claim 9, wherein said processor further comprises:

circuitry for receiving an input that said previously-used exhibit is a two-story exhibit;

circuitry for obtaining a two-story adjustment factor when said previously-used exhibit is said two-story exhibit; and circuitry for modifying said final estimated price based on said two-story adjustment factor before the step of setting said final estimated price to equal said default estimated price when said final estimated price is less than said default estimated price.

* * * * *